United States Patent [19]

Owens et al.

[11] Patent Number: 4,460,734

[45] Date of Patent: Jul. 17, 1984

[54] SELF-LEVELING FLOOR POLISH COMPOSITIONS

[75] Inventors: Joseph M. Owens; Charles E. O'Farrell, both of Hatboro, Pa.

[73] Assignee: Rohm and Haas Company, Philadelphia, Pa.

[21] Appl. No.: 486,591

[22] Filed: Apr. 19, 1983

[51] Int. Cl.$^3$ ............................................... C08K 5/06
[52] U.S. Cl. .................................... 524/376; 524/487; 524/366
[58] Field of Search ............... 524/366, 376, 378, 487; 106/3, 10

[56] References Cited

U.S. PATENT DOCUMENTS 4,131,585 12/1978 Feigin .................................. 524/368

Primary Examiner—Joseph L. Schofer
Assistant Examiner—J. M. Reddick
Attorney, Agent, or Firm—Alex Sluzas

[57] ABSTRACT

This invention relates to self-leveling floor polish polymer compositions which may be formulated into floor polishes without requiring the use of additional leveling agents. These compositions are prepared by treating conventional floor polish emulsions or formulations with polyalkoxylated linear aliphatic alcohol as leveling agent.

8 Claims, No Drawings

SELF-LEVELING FLOOR POLISH COMPOSITIONS

BACKGROUND OF THE INVENTION

1. Field of the Invention

This invention relates to self-leveling floor polish polymer compositions which may be formulated into floor polishes without requiring the use of additional leveling agents. These compositions are prepared by treating conventional floor polish emulsions or formulations with polyalkoxylated linear aliphatic alcohol as leveling agent.

2. Brief Description of the Prior Art

Leveling is a key performance property characterizing floor polish. Leveling agents are employed to provide smooth polish films of uniform gloss, without the ridges and swirls of uneven film deposition which reflect the pattern of the string mop or other applicator. In the past adequate leveling performance has been obtained for floor polish formulations with the use of tris-butoxyethyl phosphate as the leveling agent. This modifier is expensive, difficult to incorporate into the formulation and detracts from the wear resistance properties of the applied floor polish. Excessive amounts of tris-butoxyethyl phosphate may permanently plasticize the floor polish film, adversely affecting wear properties and contributing to soiling.

The physical/chemical basis of leveling is obscure. Although it has been suggested that the effectiveness of tris-butoxyethyl phosphate is related to its ability to reduce the surface tension of a floor polish formulation, it is evident that the relationship between surface tension and leveling is more complicated since other floor polish ingredients, such as the fluorinated hydrocarbon surfactants used as wetting aids, which are even more effective modifiers of surface tension, do not promote adequate leveling performance.

Leveling is a function of both the leveling agent incorporated and the alkali soluble resin employed in formulating the floor polish formulation. Alkali soluble resins are typically acrylic, or styrene/maleic anhydride, or modified rosin ester resins. These alkali soluble resins are all referred to as leveling aids.

Floor polish leveling agents comprising alkoxylated branch chain alcohols and mercaptans are disclosed in U.S. Pat. No. 4,131,585 granted Dec. 6, 1978, to R. Feigin. These compositions are plasticizing compounds which serve as additives for producing improved emulsion floor polishes that dry to a bright finish without buffing. These leveling agents may replace tris-butoxyethyl phosphate in a variety of floor polish formulations without detrimental effect on gloss, leveling, water resistance, heel mark resistance, or powdering resistance and in certain formulations demonstrate superior gloss, water spotting, heel mark resistance, removability, and detergent resistance. Feigin further discloses that alkoxylated linear alcohols are not only ineffective but also detrimental and inoperative as leveling agents (Column 2, lines 31-34), in contradiction to the instant disclosure.

U.S. Pat. Nos. 2,865,877, 4,022,730, and 4,168,255 all teach the use of ethoxylated alkylphenol nonionic surfactants to enhance polish leveling performance. However, leveling performance cannot be achieved without the use of tris-butoxyethyl phosphate.

U.S. Pat. No. 3,770,684, granted November, 1973 to Driscoll and Singer discloses water soluble polyethers of molecular weight from about 3,000 to 3,500, having water insoluble hydrocarbon residues of molecular weight from about 220 to 400 at either end of the polyether chain, for use as leveling agents and viscosity improvers in latex paints.

U.S. Pat. No. 3,802,835 granted April, 1974 to H. Prieto discloses a liquid ammonia dye bath with a monohydroxy lower alkyl alcohol leveling agent. Dye bath leveling agents for dying of polyester fibers are disclosed in U.S. Pat. No. 3,989,456 granted November, 1975 to Daeable, Vescia, and Wieder. The use of $C_8$–$C_{12}$ aliphatic alcohols as leveling agents in dye dispersion baths at greater than 100° C. is disclosed.

SUMMARY OF THE INVENTION

One of the objects of this invention is to provide an aqueous floor polish polymer composition containing a leveling agent or mixture of leveling agents. Another object of this invention is to provide a floor polish formulation exhibiting good leveling characteristics. Yet another object of this invention is to provide an aqueous floor polish emulsion which contains a pre-added leveling agent that requires no subsequent addition of leveling agent by floor polish manufacturers in order to produce aqueous floor polishes with good leveling characteristics. Another object of this invention is to provide a composition including an aqueous floor polish polymer composition containing a leveling agent other than tris-butoxyethyl phosphate. Another object of this invention is to provide a process for polishing floors with compositions formulated with novel leveling agents.

These objects and other objects which will become apparent below are met by this invention. The compositions of this invention comprise an aqueous floor polish polymer composition containing polyalkoxylated linear aliphatic alcohol as leveling agent.

DETAILED DESCRIPTION OF THE INVENTION

In one embodiment this invention comprises a floor polish polymer composition containing polyalkoxylated linear aliphatic alcohol as leveling agent. The floor polish composition contains polymer, usually in the form of a water insoluble latex polymer prepared by emulsion polymerization and dispersed in the aqueous medium, and leveling agent. The polymer composition may contain additional components, such as preservatives, dispersants, antimicrobial agents, dyes, coloring and the like. The polymer composition may be used to formulate aqueous polishes, in particular aqueous floor polishes. Typically, aqueous floor polishes (floor polish compositions) are prepared from the polymer composition by the addition of further components. These components may be alkali soluble resins, wax emulsions, plasticizers, surfactants, preservatives, perfumes, base, and water. Typically, the percentage by weight of polymer in the floor polish composition is substantially less than that in the polymer composition because the polymer composition is diluted by the addition of these other components. Floor polish compositions prepared with the polymer compositions of this invention do not require the further addition of components specifically for the purpose of achieving good leveling performance. For this reason, these floor polish compositions and polymer compositions may be referred to as "self-leveling."

It is preferred that the linear aliphatic alcohol of this invention be polyalkoxylated with at least one compound selected from the group consisting of ethylene oxide, propylene oxide and epichlorihydrin. It is more preferable that the leveling agent of this invention be at least one compound selected from the group consisting of polyalkoxylated linear alcohols of the formula $$CH_3(CH_2)_mO(CH_2CH_2O)_nH \qquad (I)$$

wherein m and n are integers and n is greater than one. Preferably, m is an integer from 9 to 15 and n is an integer from 2 to 6. The leveling agent of this invention may be composed of mixtures of polyalkoxylated linear aliphatic alcohols. A polyalkoxylated alcohol is distinguished from a monoalkoxylated alcohol in that it contains more than one alkoxy group.

The preparation of the polyalkoxylated linear aliphatic alcohols of the instant invention is well known in the chemical art. For example, see N. Shachat and H. L. Greenwald, "Mechanism of Ethylene Oxide Condensation," in *Nonionic Surfactants,* 8–43 (Marcel Dekker, New York, 1967), for a review of the chemistry of ethylene oxide condensation with linear alcohols. Alkoxylation typically results in a distribution of products with different molecular weights. Mixtures of polyalkoxylated linear alcohols may be used in this invention. Ethoxylated linear alcohols prepared under basic conditions can be fit to the Nycander distribution model. Id. at 37. Alkoxylation is discussed in C. A. Buehler and D. E. Pearson, 1 *Survey of Organic Synthesis* 304–05 (Wiley-Interscience 1970). Studies of product distributions and catalysts for alkoxylation are given in S. Winstein and R. B. Henderson, 1 *Heterocyclic Compounds* 22–39 (Wiley & Sons 1950); Parker and Isaacs, 59 *Chem. Rev.* 737–99 (1959); H. C. Chitwood and B. T. Freure, 68 *J. Amer. Chem. Soc.* 680 (1946); and Addy and Parker, *J. Chem. Soc.* 915 (1963).

Examples of polyalkoxylated linear alcohols are
$CH_3(CH_2)_3O(CH_2CH_2O)_3H$,
$CH_3CH_2CH_2O[CH(CH_3)CH_2O]_3H$,
$CH_3(CH_2)_6O(CH_2CH_2O)_4H$,
$CH_3CH_2O[CH(CH_3)CH_2O]_2H$,
$CH_3(CH_2)_7O[CH(CH_3)CH_2O]_2(CH_2CH_2O)_5H$,
$CH_3(CH_2)_3O(CHClCH_2O)_3H$,
$CH_3(CH_2)_{10}O(CH_2CH_2O)_6H$, and
$CH_3(CH_2)_{11}O[CH(CH_3)CH_2O]_4H$.

Since the leveling agent of this invention may be a mixture of alkoxylated linear aliphatic alcohols, this mixture may be characterized by the average number of methylene units and the average number of alkoxy units of the alkoxylated alcohols of the mixture. For example, when the leveling agent consists of a mixture of alkoxylated linear alcohols given by Formula I above, that mixture may be characterized by the giving the average values of n and m. In one embodiment of this invention, it is preferred that the average value of m be about 12.5 and the average value of n be from about 2 to 4. It is more preferable that the average value of n be about 3.

Preferably, the aqueous floor polish polymer compositions of this invention contain about 5% to 50% by weight water insoluble addition polymer obtained by emulsion polymerization of at least one ethylenically unsaturated monomer. Preferably, the water insoluble addition polymer is obtained by emulsion polymerization of at least one ethylenically unsaturated monomer selected from the group consisting of the ($C_1$–$C_8$) alkyl acrylates and methacrylates, mono- and di-($C_1$–$C_5$) alkyl itaconates and fumarates, maleic anhydride, vinylidene chloride, styrene, vinyl toluene, acrylonitrile, methacrylonitrile, acrylamide, methacrylamide, acrylic acid, methacrylic acid, itaconic acid, fumaric acid, citraconic acid, crotonic acid, beta-acryloxypropionic acid, and the hydroxy-($C_1$–$C_6$)-alkyl acrylates and methacrylates. In one embodiment of this invention the emulsion polymer may be soluble in alkali. Preferably, the ratio of the total weight of leveling agents to polymer solids is from about 0.05 to 0.15.

In one embodiment, the compositions of this invention are suitable as floor polishes, and contain alkali soluble resin, dispersing agent, surfactant, ammonia and transition metal crosslinking agent in addition to the leveling agent of this invention. These compositions may also contain wax, such as synthetic polyethylene wax or wax obtained as a natural product such as carnuba wax. Further, they may also contain plasticizer and coalescent.

The use of emulsion polymerization to prepare water insoluble addition polymer from an ethylenically unsaturated monomer is well known in the art. The practice of emulsion polymerization is discussed in detail in D. C. Blackley, *Emulsion Polymerization,* (Wiley, 1975). The compositions of this invention may also be formulated using internally plasticized polymer emulsions. Preparation of internally plasticized emulsion is described in detail in U.S. Pat. No. 4,150,005, granted Apr. 17, 1979 to D. R. Gehman et al., herein incorporated by reference. The preparation of noninternally plasticized floor polish emulsion polymers is described in U.S. Pat. No. 3,573,239, granted Mar. 30, 1981, to R. E. Zdanowski; U.S. Pat. No. 3,328,325, granted June 27, 1967, to R. E. Zdanowski; U.S. Pat. No. 3,554,790, granted Jan. 12, 1971 to D. R. Gehman, et al., and U.S. Pat. No. 3,467,610, granted Sept. 16, 1969 to I. S. Fiarman et al., all herein incorporated by reference.

Conventional emulsion polymerization techniques may be used to prepare the polymers employed in the compositions of this invention. Thus the monomers may be emulsified with an anionic, or cationic or nonionic dispersing agent, about 0.5% to 10% thereof on the weight of total monomers can be used. Acidic monomers are water soluble enough to serve as dispersing agent which aid in emulsifying the other monomers used. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of ½ to 2% each based on the weight of monomers to be copolymerized. The polymerization temperature may be from room temperature to 90° C. or more, as is conventional.

Examples of emulsifiers which are suited to the polymerization process of emulsions used in the present invention include alkaline metal and ammonium salts of alkyl, aryl, aralkyl, and aralkyl sulfonates, sulfates, and polyether sulfates; the corresponding phosphates and phosphonates; and ethoxylated fatty acids, esters, alcohols, amines, amides, and alkylphenols.

Chain transfer agents, including mercaptans, polymercaptans, and polyhalogen compounds, are often desirable in the polymerization mixture to control polymer molecular weight.

The acidic monomers which may be used in preparing the emulsions employed in the instant invention are alpha, beta-monoethylenically unsaturated acids such as maleic, fumaric, crotonic, citraconic, acryloxypropionic, acrylic, methacrylic, or itaconic. Further examples of acidic monoethylenically unsaturated monomers that may be copolymerized to form the water insoluble addition polymers of the instant invention are partial esters of unsaturated aliphatic dicarboxylic acids, and particularly, the alkyl half-esters of such acids. Examples of such partial esters are alkyl half esters of itaconic acid, fumaric acid, and maleic acid wherein the alkyl group contains 1 to 6 carbon atoms. Representative members of this group of compounds methyl acid itaconic, butyl acid itaconic, ethyl acid fumaric, butyl acid fumaric and methyl acid maleate. Acrylic acid, methacrylic acid, itaconic acid, fumaric acid, citraconic acid, crotonic acid and beta-acryloxypropionic acid are preferred.

The polymers of this invention may contain residues of at least one vinyl aromatic monomer. Examples of such vinyl monomers are alpha, beta-ethylenically unsaturated aromatic monomers such as styrene, vinyl toluene, 2-bromo-styrene, o-bromo-styrene, p-chlorostyrene, o-methoxy-styrene, p-methoxy-styrene, allylphenyl ether, allyltolyl ether and alpha-methyl styrene. The polymers of this invention may also contain residues of at least one polar or polarizable nonionogenic hydrophilic monomer, such as acrylonitrile, methacrylonitrile, cis- and trans-crotononitrile, alpha-cyanostyrene, alpha-chloroacrylonitrile, ethyl vinyl ether, isopropyl vinyl ether, isobutyl vinyl ether, diethylene glycol vinyl ether, decyl vinyl ether, vinyl acetate, hydroxyalkyl(meth)acrylates, such as 2-hydroxyethyl methacrylate, 2-hydroxyethyl acrylate, 3-hydroxypropyl methacrylate, butane diallyl acrylate, 3-chloro-2-hydroxypropyl acrylate, 2-hydroxypropyl acrylate, 2-hydroxypropyl methacrylate, and vinyl thiols such as 2-mercaptopropyl methacrylate, 2-sulfoethyl methacrylate, methyl vinyl thioether, and propyl vinyl thioether. Acrylonitrile, methacrylonitrile, acrylamide, methacrylamide, and the hydroxy-($C_1$-$C_6$) alkyl acrylates and methacrylates are preferred.

The emulsion polymers of this invention may contain residues of at least one monomeric vinyl ester in which the acid moiety of the ester selected from the aromatic and ($C_1$-$C_{18}$) aliphatic acids. Examples of such acids include formic, acidic, propionic, n-buteric, n-valeric, thalmitic, steric, phenylacetic, benzoic, chloroacetic, dichloroacetic, gamma-chloro-buteric, 4-chlorobenzoic, 2-5-dimethylbenzoic, o-toluic, 2,4,5-tri-methoxybenzoic, cyclobutane carboxylic, cyclohexane carboxylic, 1-(para-methoxyphenyl)cycylohexane carboxylic, 1-(p-tolyl)-1-cyclopentane carboxylic, hexanilic, myristic, and p-toluic acids. The hydroxy vinyl moiety of the monomer may be selected from hydroxy vinyl compounds such as hydroxy ethylene, 3-hydroxy-prop-1-ene, 3-4--dihydroxy-prop-1-ene and 3-hydroxy-pent-1-ene, it being understood that the derivation can be purely formal as in the case of vinyl acetate monomer in which the compound may be considered to be derived from acetic acid and hydroxy ethylene, although the monomer cannot, in fact, be prepared from such precursor monomer.

The emulsion polymers of this invention may contain residues of at least one monomer selected from the acrylic and methacrylic acids of ($C_1$-$C_8$) alcohols such as methylmethacrylate, methylacrylate, ethylacrylate, ethylmethacrylate, N-butylmethacrylate, N-butylacrylate, 2-ethylhexyl acrylate, N-octylacrylate, sec-butylacrylate, iso-butylmethacrylate and cyclopropyl methacrylate. ($C_1$-$C_8$) alkyl acrylate and methacrylate monomers are preferred.

An ionic crosslinking agent may be employed in the compositions of this invention. This ionic crosslinking agent may be a polyvalent metal complex containing a polyvalent metal moiety, an organic ligand moiety and, if the crosslinker is added as a chelate to the formulation in solubilized form, an alkaline moiety. The polyvalent metal ion may be that of berrylium, cadimum, copper, calcium, magnesium, zinc, zirconium, barium, aluminum, bismuth, antimony, lead, cobalt, iron, nickel or any other polyvalent metal which can be added to the composition by means of an oxide, hydroxide, or basic acidic or neutral salt which has an appreciable solubility in water such as at least about 1% by weight therein. The alkaline moiety may be provided by ammonia or an amine. The organic ligand may be ammonia or an amine or an organic bidentate amino acid. The amino acid bidentate ligand may be an aliphatic amino acid, but may also be a hetrocylic amino acid.

The amino acid bidentate ligands may be represented by the formula

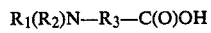

$$R_1(R_2)N-R_3-C(O)OH$$

wherein
$R_1$ and $R_2$ are independently selected from hydrogen, alkyl phenyl and benzyl,
$R_3$ represents a straight chain or branched chain alkylene, alkylidine or aralkylidene radical having 1 to 12 carbon atoms, preferably 1 to 4 carbon atoms, with the proviso that at least 1, but fewer than 4 carbon atoms are in a straight chain joining the nitrogen atom and the carbonyl carbon atom, and
$R_1$ and $R_3$ may form a five or six-membered heterocyclic ring with a nitrogen atom to which they are joined with the proviso that $R_2$ is hydrogen.

Although $R_1$ and $R_2$ are preferably hydrogen, suitable $R_1$ and $R_2$ alkyl radicals may contain 1 to 6 carbon atoms such as methyl, ethyl, isopropyl and butyl. $R_3$ is preferably methylene, but may be ethylene, propylene, naphthilidine, n-propylidine, iso-propylidine, butylidine and phenylnaphthilidine.

Representative bidentate amino acid ligands include glycine, alanine, beta-alanine, valine, norvaline, gamma-amino butyric acid, leucine, norleucine, N-methylamino acetic acid, N-ethylamino acetic acid, dimethylamino acetic acid, diethylamino acetic acid, N-n-propylamino acetic acid, N-isopropylamino acetic acid, N-butylamino acetic acid, phenylalanine, N-phenylamino acetic acid, N-benzylamino acetic acid, and nicotinic acid.

Polyvalent metal complexes include the diammonium zinc (II) and tetra-ammonium zinc (II) ions, cadmium glycinate, nickel glycinate, zinc glycinate, zirconium glycinate, zinc alanate, copper beta-alanate, zinc beta-alanate, zinc valanate, copper dimethylamino acetate.

The polyvalent metal complex or coordinate compounds are initially readily soluble in the aqueous medium of the polish vehicle composition, especially at a pH of 6.5 to 10.5, and have the advantage of drying to form a polish deposit which is essentially insoluble in water but still removable. The polyvalent metal complex may also be added to the water insoluble emulsion copolymer in solubilized form. This is accomplished by solubilizing the metal complex in an alkaline solution such as dilute aqueous ammonia. Since the ammonia may complex with the polyvalent metal coordinate compound, a compound such as cadmium glycinate, when solubilized in an aqueous ammonia solution may be named cadmium ammonia glycinate. Other polyvalent metal complexes described may be similarly named.

The water insoluble polymer obtained by emulsion polymerization employed in the composition of the present invention may provide a hardness such that the composition containing it deposits a film having a Knoop Hardness Number (KHN) of at least 0.5 and preferably from about 1.2 to 15, though for many purposes the KNH of the coating film deposited may be as high as 16 or greater when measured on a film of 0.5 to 2.5 mm thickness on a glass panel. The emulsion copolymer may also have a minimum film-forming temperature (MFT) of less than about 85° C. and preferably less than about 80° C.

The transition metal crosslinker may be incorporated into the composition at any stage of the formulation. Although generally it is convenient to add the transition metal complex to the water insoluble addition polymer, the metal complex may be incorporated at any stage of formulation of the floor polish itself.

The processes of this invention comprise coating a surface with a composition containing an aqueous floor polish polymer composition containing polyalkoxylated linear aliphatic alcohol as leveling agent. Application may be made by string mop or other manual or mechanized applicator.

The leveling agents of the present invention may be used in floor polish formulation such as the following defined in terms of the following proportions of the main constituents:

| Constituent | Proportion |
|---|---|
| A. Water insoluble addition polymer emulsion which has been previously or subsequently crosslinked with a transition metal complex parts by solids weight. | 10–100 |
| B. Wax emulsion, parts by solids weight. | 0–90 |
| C. Alkali Soluble Resin (ASR), parts by solids weight | 0–90 |
| D. Wetting, emulsifying and dispersing agents, defoamer, leveling agents, parts by solids weight | 0.01–20 |
| E. Plasticizers and coalescing solvents, sufficient for polish film formation at application temperature. | |
| F. Water, sufficient to make total polish solids 0.5% to 45%, preferably 5% to 30%. | |

The total of A, B, and C should be 100.

The total of A, B, and C should be 100.

Examples of wetting and dispersing agents are well known in the art of floor polish formulating. These include amine and alkali metal salts of the higher fatty acids having 12 to 18 carbon atoms, such as the sodium, potassium, ammonium, morpholine oleate or recinoleate salts, as well as the common nonionic surface active agents. These agents serve to stabilize the polish formulation and also reduce its surface tension to improve the spreading action of the polish.

Defoamers and antifoams are commonly used in the practice of floor polish formulating to reduce or eliminate foam marks in the dried polish film. As the formulating art is currently practiced, these are typically fatty acids or silicone polymer emulsions. Silicone emulsions are preferred for their greater efficiency and long-term activity.

Plasticizers and coalescing solvents are employed in floor polish formulating to provide coherent films for the emulsion ingredients of the floor polish formulation under use-temperature conditions. As the art is currently practiced, plasticizing and coalescing solvents are employed in quantities sufficient to provide the formulation with a minimum film formation temperature (MFT) of less than 50° F. (10° C.). These solvents are well known to those versed in the art, and they include the alkyl and aromatic ethers of ethylene glycol, diethyleneglycol, triethyleneglycol, propylene glycol, dipropylene glycol, or tripropylene glycol, the alkyl or aromatic esters of these same glycols, the mono and dialkyl esters of phthalic acid, the mono and dialkyl esters of iso-octane diol, etc. The levels and selection of plasticizing and coalescing solvents employed may be optionally chosen by the formulator on the basis of efficiency in reducing the polish MFT, cost and availability, and their marginal effect on water resistance and gloss, depending on the balance of performance properties desired by the formulator.

Other formulation ingredients, such as perfumes or odor masking agents, dyes or colorants, bacteriocides and bacteriostats, may also be optionally included by the formulator.

The following monomer abbreviations are used in giving polymer composition:

| EA | ethyl acrylate |
|---|---|
| BA | butyl acrylate |
| MMA | methyl methacrylate |
| MAA | methacrylic acid |
| AA | acrylic acid |
| Sty | styrene |

In order to provide a clearer understanding of the invention, specific examples are set forth below. These examples are merely illustrative of this invention and are not meant to be understood as limiting the scope of the invention in any way.

The leveling agents examples and comparative examples are evaluated in the following floor polish formulation:

| Material | Parts by Weight |
|---|---|
| Water | 62.68 |
| Alkali soluble resin (42% total solids)[4] | 3.57 |
| FC-120 (1% total solids)[2] | 0.50 |
| SWS-211[3] | 0.01 |
| Diethylene glycol monoethyl ether leveling agent | 4.00 |
| Latex polymer (40% total solids)[1] | 28.13 |
| Polyethylene wax emulsion (40% total solids) | 5.63 |

[1]MMA/BA/Sty/MAA//52/28/12/8 (by weight) (includes zinc, 2.1% by weight on polymer solids as zinc metal)
[2]Fluorocarbon surfactant, wetting aid, supplied by 3M Co.
[3]Silicone emulsion, defoamer, supplied by Stauffer-Wacker Silicone Co.
[4]EA/MMA/AA/MAA//29.8/53.7/7.5/9 (by weight); blended 75/25 with Triton ® X-45 surfactant (CAS Registry No. 9036-19-5)

COMPARATIVE EXAMPLES

Table I details the floor polish performance properties of polishes prepared (1) without a leveling agent (comparative example 1), (2) with tris-butoxyethyl phosphate as leveling agent (comparative example 2) and with an ethoxylated octylphenol as leveling agent (comparative example 3, Triton®X-45 surfactant, CAS Registry No. 9036-19-5, 52% by weight ethylene oxide units, number average ethylene oxide units: 7–8).

EXAMPLES

Table I also details the floor polish performance properties of polishes prepared using ethoxylated linear alcohol leveling agents of this invention. Examples 5 and 6 exhibit performance properties which are comparable to comparative example 2, prepared with tris-butoxyethyl phosphate. Comparative example 4 is prepared with a leveling agent having the minimum possible level of ethoxylation, exhibits better film formation and recoatability than polish formulated without leveling agent; however, leveling performance is poor compared with polyethoxylated linear alcohol containing polishes.

TABLE I

|  | COMPARATIVE EXAMPLES | | | | EXAMPLES | | |
| --- | --- | --- | --- | --- | --- | --- | --- |
|  | 1 | 2 | 3 | 4 | 5 | 6 | 7 |
| Leveling Agent | None | KP-140 | Triton ® X-45 | $C_{12}(EO)_1{}^{14}$ | $C_{12}(EO)_4{}^{14}$ | $C_{12.5}(EO)_3{}^{14}$ | $C_{11.5}(EO)_6{}^{14}$ |
| Gloss[2] | F-G | Good | Fair | F-G | Good | Good | F-G |
| Leveling[3] | Poor | G-VG | Poor | Poor | Good | VG | Fair |
| Wetting[4] | VG | VG-Exc | VG-Exc | V Poor | Good | VG-Exc | Fair |
| Foam Control[5] | Exc. | Exc. | F-G | Fair | Exc | Exc | VG |
| Recoatability[6] | VG | Exc. | VG | Exc. | Exc | Exc. | Exc. |
| Recoat Leveling[7] | Poor | VG | Poor | Poor | VG | VG | Fair |
| Recoat Gloss[8] | Good | VG | Good | Good | VG | VG | Good |
| Black Mark Resist.[9] | VG | G-VG | G-VG | Good | G-VG | G-VG | VG |
| Soil Resistance[10] | VG-Exc. |  | VG | F-G | G-VG | G-VG | VG |
| Detergent Resis.[11] | Good[1] | VG | VG | VG | VG-Exc. | Exc | Good |
| Removability[12] | Exc. | G-VG | VG | VG |  | G-VG | VG |
| Powder Resistance[13] | Fair[1] | Good | Good | Good | Good | G-VG | Good |

[1]Marginal film formation, expected to adversely effect test results.
[2]ASTM D 1455-78
[3]ASTM D 3153-78
[4]ASTM D 3153-78
[5]See Test Methods
[6]ASTM D 3153-78
[7]ASTM D 3153-78
[8]ASTM D 1455-78
[9]CSMA (Chemical Specialties Mfg. Assoc.) 9-73
[10]ASTM D 3206-73 (1978)
[11]ASTM D 3207-73 (1978)
[12]ASTM D 1793-77
[13]ASTM D 2048-77
[14]$C_x(EO)_y$ = n-$C_x$H hd 2X+1O(CH$_2$CH$_2$O)$_y$H where x and y are average values.
The polish performance rating abbreviations used are:
Exc = Excellent;
VG = Very Good;
G = Good;
F = Fair;
"-" = "to", when used with abbreviations

Test Methods

Standard ASTM (American Society for Testing Materials) test procedures are used to evaluate floor polish compositions of the examples and comparative examples. In addition, foam control was evaluated as follows:
50 ml of a 1% Sipon WD (soap) solution or a polish is poured into a 100 ml stoppered graduated cylinder. The antifoamer/defoamer is then added to the solution/polish and the mixture is then shaken manually for one minute. The generated foam is measured at one minute intervals for the first five minutes and then at five minute intervals thereafter. The mixture is rated according to the total foam is generated and the speed at which it dissipates.

We claim:
1. An aqueous floor polish polymer composition, containing from about 5 to 50% by weight of water insoluble latex polymer prepared by emulsion polymerization of at least one ethylenically unsaturated monomer selected from the group consisting essentially of the ($C_1$–$C_8$) alkyl acrylates and methacrylates, the mono- and di-($C_1$–$C_5$) alkyl itaconates and fumarates, maleic anhydride, vinyldiene chloride, styrene, vinyl toluene, acrylonitrile, methacrylonitrile, acrylamide, methacrylamide, acrylic acid, methacrylic acid, itaconic acid, fumaric acid, citraconic acid, crotonic acid, beta-acryloxypropionic acid, and the hydroxy-($C_1$–$C_6$) alkyl acrylates and methacrylates and dispersed in an aqueous medium, and optionally containing any of preservatives, dispersants, anti-microbial agents, dyes or coloring agents, wherein the improvement consists essentially of a leveling agent which is at least one compound selected from the group consisting of polyalkoxylated linear alcohols of the formula

$$CH_3(CH_2)_mO(CH_2CH_2O)_nH$$

wherein m is an integer from 9 to 15 and n is an integer from 2 to 6 and wherein the weight ratio of leveling agent to latex polymer solids is from 0.0001 to 2.

2. A composition according to claim 1 wherein the polymer is soluble in alkali.

3. A composition according to claim 1 wherein the ratio of the total weight of leveling agent to polymer solids is from about 0.05 to 0.15.

4. A composition according to claim 1 wherein the average value of m is about 12.5 and the average value of n is from about 2 to 4.

5. A composition according to claim 4 wherein the average value of n is about 3.

6. A composition according to claim 1 additionally containing plasticizer.

7. A composition according to claim 1 in which the linear aliphatic alcohol is selected from n-decyl, n-undecyl, n-dodecyl, n-tridecyl and n-tetradecyl alcohols and mixtures thereof.

8. An aqueous floor polish prepared from the aqueous floor polish polymer composition of claim 1, additionally containing from 0–90 parts by weight of solids of alkali soluble resin, from 0–90 parts by weight solids of wax emulsion, and 0.01–20 parts by weight solids of any of defoamer, wetting, dispersing and emulsifying agents, wherein the total weight of solids is based on the solids weight of emulsion polymer, alkali soluble resin and wax emulsion.

* * * * *